INVENTOR.
JAMES M. HUCKABEE
BY Paul D. Carmichael
ATTORNEY

United States Patent Office 3,430,005
Patented Feb. 25, 1969

3,430,005

RECORDING AND REPRODUCING HEADS WITH MEANS FOR RECORDING BOTH MAGNETICALLY AND MECHANICALLY

James M. Huckabee, Lexington, Ky., assignor to International Business Machines Corporation, Armonk, N.Y., a corporation of New York Filed June 30, 1965, Ser. No. 468,404
U.S. Cl. 179—100.1 17 Claims
Int. Cl. G11b *5/00;* H04r *23/02*

ABSTRACT OF THE DISCLOSURE

Recording and reproducing heads are provided which are capable of selectively recording or reproducing information on record media using different recording and reproducing techniques. A recording and reproducing head comprises a magnetic transducing gap and a separate mechanical transducing stylus. The recording head is mounted to permit either the magnetic gap or the stylus to be positioned in operative transducing relation with a record medium depending on whether the medium is of the mechanical groove or magnetic type.

The present invention relates generally to the recording and reproducing arts and more particularly to the provision of various transducers each capable of recording or reproducing previously recorded information on record media by selectively employing a plurality of recording and reproducing methods. As will be hereinafter more fully explained, the recording and reproducing heads of this invention permit the interchangeable use of record members between equipment using different methods of recording and reproducing information.

A number of methods or techniques are well known in the art for recording and reproducing information. Some of the commonly employed methods are based on mechanical, magnetic or optical phenomena. In the dictating art it is usual practice to provide a dictating machine having a recording and reproducing head and adapted to receive a cylindrical dictating belt. Drive means are included for rotating the dictating belt and moving the head transversely across the belt so that a helical recording pattern is formed thereon.

A stylus dictating machine employs a relatively sharp stylus that cuts or scribes a groove in the surface of the belt during recording operations. The grooves is modulated in accordance with the dictated material. Previously recorded dictation is reproduced by sensing the undulations in the groove. Another type of dictating machine uses magnetic recording techniques. A magnetic recording and reproducing head and a magnetizable dictating belt are employed. The dictated material is recorded as magnetic information along the helical recording pattern without any physical damage to the belt. Magnetic dictating machines offer certain advantages and are finding wider acceptance because of the ability to erase information which permits "error free" dictation and reuse of the dictating belts.

A problem which has long confronted both users and manufacturers of dictation equipment is the incompatibility of stylus and magnetic dictating machines. A dictating belt having dictation recorded thereon by a stylus dictating machine could not be transcribed using magnetic dictation equipment. Similarly, magnetic dictating belts could not be transcribed employing stylus dictation equipment. This has meant a user must standarize on either stylus or magnetic dictation machines if all of his dictation equipment is to be compatible which is necessary if maximum benefit is to be obtained from the equipment. Further, a manufacturer of dictation equipment has been precluded to a certain extent from changing from stylus to magnetic dictation machines because of this compatibility problem.

Briefly, the present invention relates to recording and reproducing heads which are capable of selectively recording or reproducing information on record media using different recording and reproducing techniques. In the illustrated embodiments of the invention, these heads are adapted to record or reproduce information on record media using selectively or in combination mechanical and magnetic means. The recording and reproducing heads each comprise a magnetic circuit having a gap therein and at least one winding. Energization of the winding in accordance with the information to be recorded causes changes in the flux in the magnetic circuit. A changing magnetic signal is recorded on a magnetizable record medium. This information is retrieved by passing the gap over the record medium and detecting the electrical signal generated in the winding.

A mechanical sensing member, such as a stylus, is operatively connected to a magnet which is disposed in magnetically coupled relation in the magnetic circuit. When the winding is energized in accordance with information to be recorded, magnetic forces are generated which cause movement of the magnet and stylus. The stylus cuts a groove in a record medium and this groove is modulated in a manner corresponding to the information. Previously recorded information is reproduced by sensing the undulations of the groove with the stylus and detecting the resultant electrical signals induced in the winding.

A recording and reproducing head is mounted for indexing movement to permit either the gap or the stylus to be positioned in operative relation with a record medium. This may be accomplished by rotatably mounting the head so that when the gap is in operative relation with a magnetic record medium, the stylus is in an inoperative position. When the head is rotated from this position, the stylus is brought into operative relation with a groove record medium and the gap is retracted. A recording and reproducing head can be employed to sense recorded information using a first recording method and record this information employing a second recording method without intermediate electrical amplification of the invention. Also, the same information can be recorded simultaneously using two different recording methods or techniques.

It is the primary or ultimate object of the invention to provide recording and reproducing heads which ar capable of selectively recording or reproducing information recorded on record media employing a plurality of recording and reproducing methods or techniques. Each of the heads comprises a magnetic circuit having a magnetic recording or reproducing gap and a mechanical recording or reproducing stylus which is operatively coupled to the magnetic circuit.

Another object of the invention is to provide recording and reproducing heads wherein any selected one of a number of different recording or reproducing means each employing a different recording and reproducing method or technique can be operatively positioned at a recording or reproducing station. The recording and reproducing head may be mounted for rotary movement to provide for the selected indexing movement of the recording and reproducing means.

Yet another object of the invention is the provision of recording and reproducing heads which allow either magnetic or groove type dictating belts to be employed in a dictating machine. This permits the same dictating machine to be used in transcribing belts dictated on both magnetic and stylus dictation equipment thereby greatly increasingly the versatility and usefulness of dictating equipment.

A further object of the invention is the provision of a dictating machine capable of accepting and employing either magnetic or groove type dictating belts. Means are provided for indexing the recording and reproducing head to bring the proper transducer into operative relation with the dictating belt in accordance with the type of belt being used. Also, the drive means for the dictating belt and the recording and reproducing head are changed during the indexing of the recording and reproducing head.

A still further object of the invention is the provision of apparatus having the characteristics set forth above which is extremely simplified in construction and operation whereby the same may be manufactured at low cost but yet is highly reliable in operation.

The foregoing and other objects, features and advantages of the invention will be apparent from the following more particular description of preferred embodiments of the invention as illustrated in the accompanying drawings.

Figures 1, 2, 3:
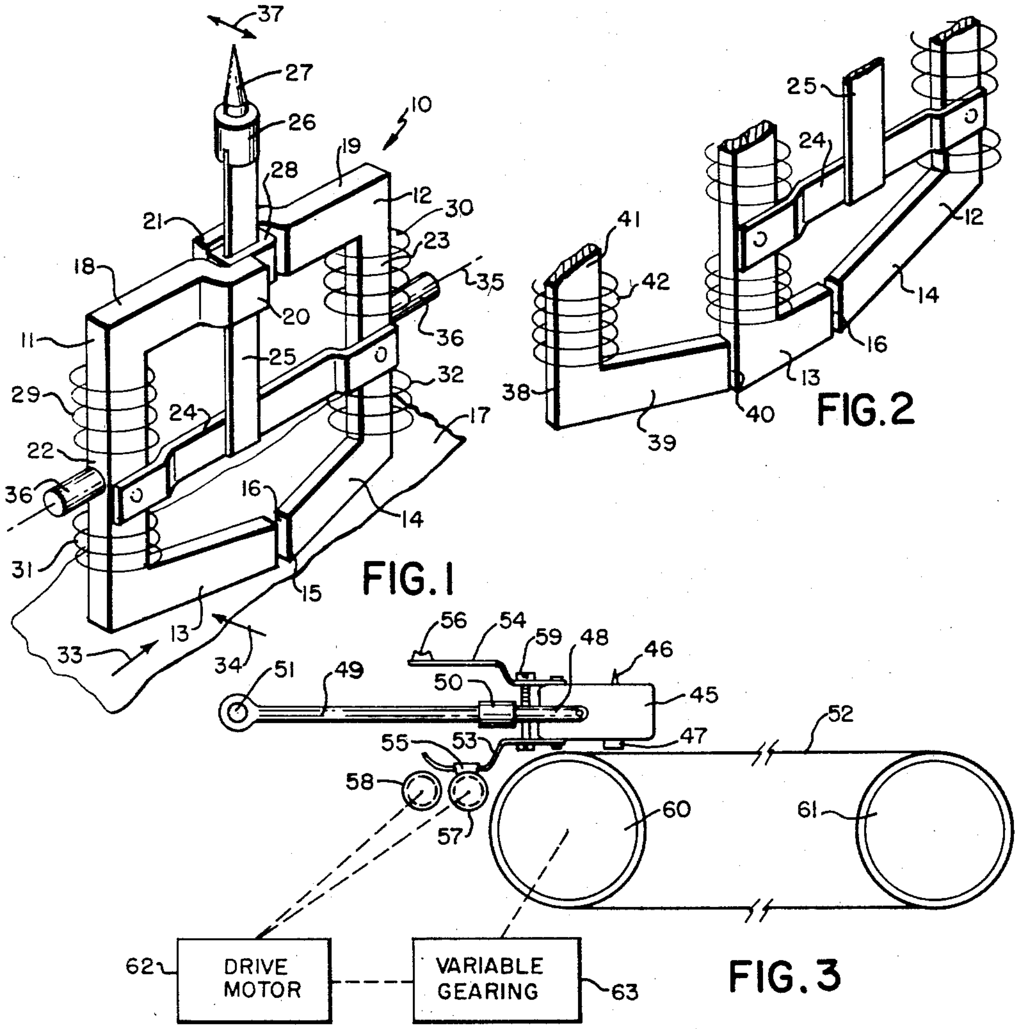
FIGURE 1 is a side perspective view of a recording and reproducing head constructed in accordance with and embodying the teachings of the present invention.
FIGURE 2 is a fragmentary view of a portion of a recording and reproducing head similar to that shown in FIGURE 1 having an integral erase winding and magnetic gap.
FIGURE 3 is a schematic side view of a dictation machine employing the recording and reproducing head shown in FIGURE 2 and capable of accepting either magnetic or groove type dictating belts.

Referring now to the drawings, and initially to FIGURE 1 thereof, the reference numeral 10 designates generally a recording and reproducing head constructed in accordance with the teachings of this invention. The head has a generally rectangular magnetic core structure provided by a pair of inwardly facing U-shaped core members 11 and 12. One set of legs 13 and 14 of the core members have end faces 15 which are disposed in closely adjacent spaced relation to define a recording and reproducing gap 16. The gap is designed to cooperate with a dictating belt 17 in recording and reproducing magnetic information on the belt.

The other set of legs 18 and 19 of the core members 11 and 12 have end portions which are formed to provide overlapping and spaced L-shaped pole pieces 20 and 21. Spanning the vertical legs 22 and 23 of the core members 11 and 12 between the gap 16 and the pole pieces 20 and 21 is a nonmagnetic strap 24 which serves as a mounting support for one end of a permanently magnetized and thin reed 25. The reed projects through the opening between the L-shaped pole pieces 20 and 21. Carried on the outer end of the reed is a chuck 26 that mounts a relatively sharp and pointed recording stylus 27. A tubular bushing 28 formed of suitable resilient and compliant material surrounds the magnetized reed 25 and fills the space between the pole pieces 20 and 21. This bushing serves to yieldably maintain the reed in equally spaced relation between the pole pieces when the recording and reproducing head is not energized.

Wound about the vertical legs 22 and 23 of the core members 11 and 12 are a pair of recording and playback coils 29 and 30. During recording operations, these coils are connected with amplifying apparatus, not shown, and receive signals corresponding to the information to be recorded on the dictating belt 17. When a previously recorded dictating belt is being transcribed or the dictating machine is in the listen mode, the coils 29 and 30 serve as playback coils which sense and detect the variations in the magnetic flux in the magnetic core circuit. The resulting electrical signal in the playback coils correspond to the information previously recorded on the dictating belt and are supplied via amplifiers to a speaker, not shown. Also wrapped about the vertical legs 22 and 23 of the core members are a pair of series connected bias coils 31 and 32. During recording operations a bias signal is supplied to these coils from a suitable bias source, such as a relatively high frequency oscillator, also not shown. The use of a high frequency alternating current biasing signal is well known to those skilled in the recording and reproducing arts.

To record information on the dictation belt 17 using magnetic techniques, the recording and reproducing head 10 is moved in the direction of arrow 34 while the dictating belt is rotated in the direction indicated by arrow 33. This transverse relative movement between the recording and reproducing head and the dictating belt 17 causes a generally helical recording pattern to be formed on the surface of the belt. A high frequency alternating current biasing signal is supplied to biasing coils 31 and 32 while recording coils 29 and 30 are energized by electrical signals corresponding to the dictation to be recorded. A changing or varying flux field occurs in the recording and reproducing gap 16 and a major portion of this magnetic field passes through magnetic material coated on or embedded in the dictating belt 17. The dictation is recorded as magnetic information on the dictating belt in this manner.

In reproducing or retrieving the magnetic information previously recorded on the dictating belt, the circuits in the dictation equipment are switched so that coils 29 and 30 are connected in a suitable playback circuit. Relative movement is again effected between the dictating belt 17 and the recording and reproducing head. The magnetic signals on the belt are sensed by the gap 16 and changing flux linkages are generated in the magnetic circuit. The variations in the magnetic field in the magnetic circuit induce electrical signals in the playback coils which are amplified and converted to sound.

The stylus 27 is disposed directly opposite the recording and reproducing gap 16 and means are provided for rotating the recording and reproducing head 10 about axis 35 so that either the gap 16 or the stylus 27 can be brought into operative relation with the dictating belt 17. The mounting means which permits the rotative turn over movement of the recording and reproducing head is represented schematically in FIGURE 1 of the drawings by a pair of pivot pins 36. To employ the stylus 27 in recording and reproducing dictation, the head 10 is rotated until the stylus is disposed in operative relation with a groove type dictating belt. In recording information, the recording coils 29 and 30 are energized in exactly the manner disclosed above in connection with the recording of magnetic information. The bias windings 31 and 32 can also be energized at this time but better results are obtained if biasing signals are not supplied when recording dictation with the stylus 27. The electrical signals in the recording coils 29 or 30 induce a varying magnetic field in the magnetic circuit. The pole pieces 20 and 21 assume opposite and changing polarities in accordance with the varying magnetic field in the magnetic circuit and the pole pieces exert magnetic attractive and repulsive forces on the permanently magnetized reed 25. For example, if the reed 25 is magnetized to have a magnetic north pole adjacent its free end and the instantaneous field in the magnetic circuit causes the pole piece 20 to act as a south pole and the pole piece 21 to become a north pole, the reed will be magnetically attracted to pole piece 20 and repulsed from pole piece 21. The reed 25 is deflected against the restraining force of the resilient and compliant bushing 28 and a movement is imparted to stylus 27. When the magnetic field is reversed the polarities of the pole pieces 20 and 21 are reversed and the stylus 27 will move in the opposite direction. The arrangement is such that the stylus 27 oscillates back and forth in a transverse plane represented by arrow 37. As the dictating belt and the recording and reproducing head are moved relative to each other the stylus cuts a groove in the dictating belt 17 which is modulated laterally in accordance with the dictated material.

A previously recorded groove type dictating belt is reproduced by allowing the stylus 27 to follow or sense the lateral undulations in the groove. This causes lateral movement of the permanently magnetized reed 25 between the pole pieces 20 and 21 and a corresponding magnetic field is induced in the magnetic circuit. Electrical signals are generated in the playback coils 29 and 30 and are then amplified and transduced to reproduce the previously recorded dictation.

The magnetic circuit disclosed in connection with the permanently magnetized reed 25 is highly efficient and offers many advantages. The magnetic reed acts as a magnetic pole of one polarity which is disposed between pole pieces 20 and 21 of different magnetic polarities. At any instant in time during a recording operation, the reed is magnetically attracted to one pole piece and magnetically repelled from the other pole piece. A differential push-pull type action occurs in the magnetic circuit during both recording and reproducing which greatly enhances the response and overall operation of the recording and reproducting head. It is noted that the magnetized reed 25 will move back and forth or oscillate when the recording and reproducing head is employed with magnetic dictating belts. This does not adversely affect the operation of the recording and reproducing head but a stop can be provided for maintaining the reed stationary when the head is in the position shown in FIGURE 1 of the drawings if this is required. Also, the rotative mounting for the recording and reproducing head would normally include a detent means for releasably holding the head in either of the two rotative recording and reproducing positions.

In certain situations it is desirable to provide the recording and reproducing head with an integral magnetic erasing means and such an arrangement is shown in FIGURE 2 of the drawings. To avoid unnecessary repetition in the specification, only the differences relative to the recording and reproducing head shown in FIGURE 1 of the drawings will be described in detail. Also, the same reference numerals have been employed to designate similar parts in these embodiments of the invention. A third and generally U-shaped core member 38 is disposed adjacent core member 11 and has a leg 39 which is spaced from the leg 13 of the core member 11 sufficiently to define a magnetic erase gap 40. Wound about the vertical leg 41 of the core member 38 is an erase coil 42 which is energized from a suitable source as is well known in the recording and reproducing arts. Thus, the magnetic dictating belt is "erased" and assumes a preferred magnetic state at a point in front of the magnetic recording and reproducing gap 16. The erase gap 40 is not, of course, employed during reproducing operations when previously recorded information is being sensed and reproduced.

FIGURE 3 of the drawings illustrates the manner in which a recording and reproducing head employing both magnetic and stylus recording and reproducing means can be incorporated in a dictating machine. The recording and reproducing head is mounted in a cartridge 45 with the stylus 46 and magnetic gap 47 projecting from opposite sides thereof. The cartridge 45 is pivoted between the arms of a bifurcated mounting member 48 which is journaled for rotation about the axis of support 49 by a rotative coupling element 50. The support 49 is slidable transversely on a rod 51 as the recording and reproducing head moves across the surface of dictating belt 52. Mounted on the opposite side of the cartridge 45 and extending rearwardly therefrom are a pair of arms 53 and 54 which carry lead screw followers 55 and 56, respectively, on the outer ends thereof. These followers selectively engage a pair of generally parallel disposed and transversely extending lead screws 57 and 58 of different pitch depending on whether the stylus 46 or the magnetic gap 47 is positioned in operative relative with the dictating belt 52. Screws 59 are provided so the forces exerted on the dictating belts by the magnetic gap and the stylus can be individually adjusted. A dictating belt is received over a pair of guide rolls 60 and 61 and one of these is driven by a drive motor 62 acting through variable gearing 63. The drive motor also is connected to rotate the two lead screws 57 and 58.

To record or reproduce information on a magnetic dictating belt the cartridge 45 is in the position shown in FIGURE 3 of the drawings with the magnetic gap 47 adjacent the surface of the dictating belt and the follower 55 engaging its associated lead screw 57. The appropriate screw 59 is adjusted so the correct contact pressure is maintained between the magnetic gap and the dictating belt. Energization of the motor 62 causes relative movement between the dictating belt and the recording and reproducing head and a helical pattern is formed on the dictating belt. When a groove type dictating belt is employed, the cartridge 45 is turned over and the stylus 46 engages the dictating belt. The follower 56 is connected with lead screw 58 and the variable gearing 63 is adjusted to change the speed of rotation of the driven roller 60. A helical pattern is cut on the groove type dictating belt which is somewhat different from the pattern traced on a magnetic dictating belt because a different lead screw and recording speed are employed.

The pitches of the lead screws 57 and 58 and the recording speeds are selected in accordance with those widely used in the art for various types of dictating equipment. For example, the lead screw 57 and the associated setting of the variable gearing 63 may result in an approximate recording speed of two inches per second with a track-to-track separation of .025 of an inch for magnetic dictating belts. The lead screw 58 and a different setting of the variable gearing 63 might produce a recording speed of approximately eight inches per second and a track-to-track separation of .005 of an inch for groove type dictating belts. In this manner, the dictating machine is compatible with both magnetic and stylus dictation equipment being sold and in use at the present time.

Figure 4:
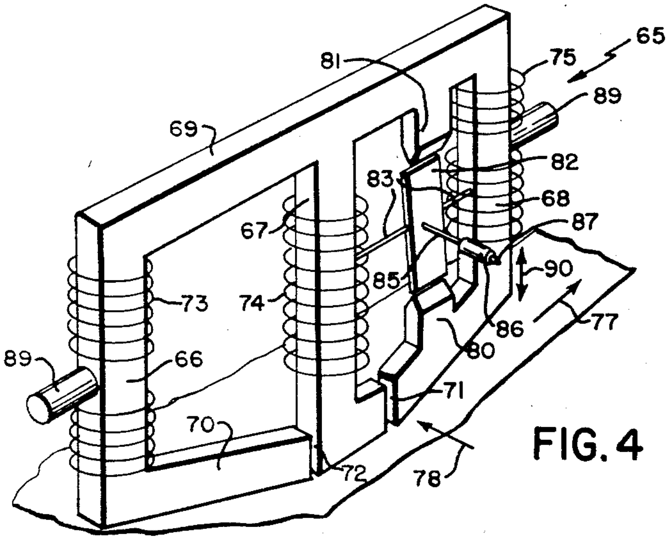
FIGURE 4 is a side perspective view of another embodiment of the recording and reproducing heads of this invention.
Figures 5, 6, 7:
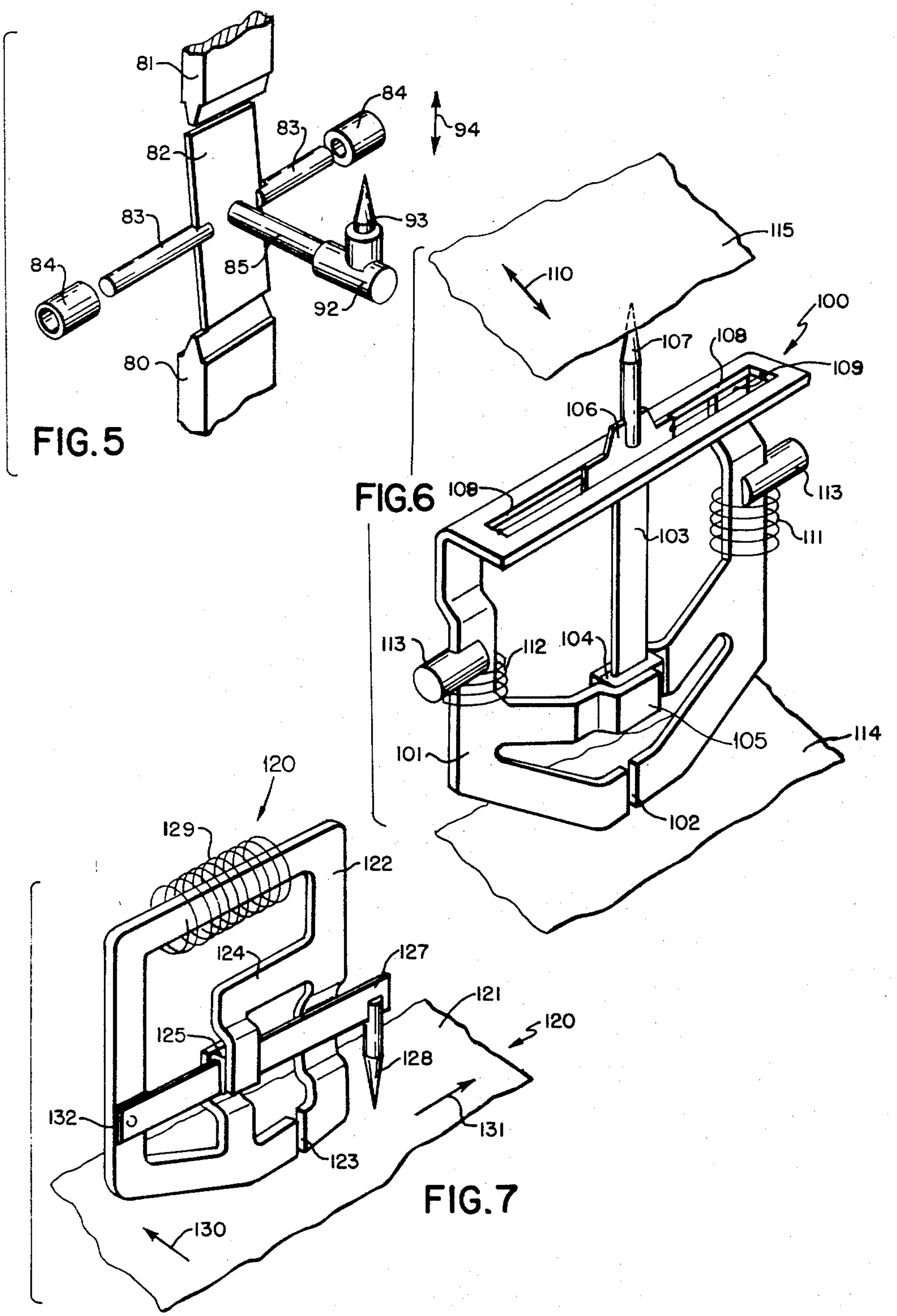
FIGURE 5 is an exploded side perspective view depicting specifically an alternative stylus mounting arrangement for use in the recording and reproducing head of FIGURE 4.
FIGURES 6 and 7 are side perspective views of still further embodiments of the present invention.

Other versions of recording and reproducing heads are shown in FIGURES 4 and 5 of the drawings. A recording and reproducing head 65 has a magnetic core structure defined primarily by three spaced vertical legs 66–68 and two spaced horizontal legs 69 and 70. Positioned in the horizontal leg 70 on opposite sides of the center vertical leg 67 are a magnetic recording gap 71 and a magnetic erase gap 72. Wrapped about the vertical legs 66–68 are erase, bias and recording and playback coils 73–75, respectively, which are connected to suitable signal sources and amplifiers, not shown.

For recording dictation on a magnetic dictating belt, the belt is rotated in the direction indicated by arrow 77 while the recording and reproducing head moves transversely relatively to the dictating belt in the direction of arrow 78. Dictation is supplied as a varying electrical signal to coil 75 while erase and biasing signals energize the erase and bias coils 73 and 74. The changing flux field in the recording and reproducing gap 71 corresponding to the dictated material is stored as magnetic information on the dictating belt. Previously recorded information is sensed by the magnetic gap 71 and a signal is induced in the playback coil 75 that is amplified and then converted to sound by speaker mechanism, not shown.

Projecting vertically inward from the horizontal legs 69 and 70 and disposed between the vertical legs 67 and 68 of the magnetic core structure are magnetic pole pieces 80 and 81. Positioned between these pole pieces is a permanently magnetized reed 82 which is pivotally mounted for swinging movement by rods 83 whose ends are received in bushings 84 of resilient and compliant material. The bushings 84 are secured to the vertical legs 67 and 68 of the magnetic core structure. The bushings 84 maintain the reed 82 in slightly tipped or coated relation with respect to the plane of the pole pieces 80 and 81 when the reed is in its normal or at rest position. This mounting arrangement in effect defines a bias which insures the reed will pivot in the proper and preferred rotational direction when energizing signals are supplied to recording coil 75. Attached to the center of the magnetized reed 82 is an outwardly projecting rod 85 which carries a mounting chuck 86 for a relatively sharp stylus 87.

In order to record and reproduce dictation on groove type dictating belts, the head shown in FIGURE 4 of the drawings is rotated ninety degrees in a clockwise direction about pivot pins 89. The stylus 87 engages the surface of the dictating belt and oscillates as represented by arrow 90 in accordance with the signals supplied to recording coil 75 during recording operations. The stylus vibrates because the ends of the reed 82 are magnetic poles of opposite polarity which are repulsed and attracted by the pole pieces 80 and 81 in accordance with the instantaneous varying magnetic polarities of these pole pieces as determined by the electrical signal supplied to the recording coil 75. The stylus 87 cuts or scribes a groove in the surface of the dictating belt which is modulated in a lateral cut mode. In reproducing recorded information, the stylus 87 senses the lateral undulations in the groove and the permanently magnetized reed is oscillated. This movement of the reed generates a varying magnetic flux in the magnetic circuit which in turn induces detectable electrical signals in the recording and playback coil 75.

The arrangement shown in FIGURE 5 of the drawings represents a variation of the recording and reproducing head disclosed in connection with FIGURE 4 wherein a mounting chuck 92 permits a stylus to be mounted at right angles relative to mounting a stylus 87. To record and reproduce information on groove type dictating belts, the head is rotated one hundred and eighty degrees about pivot pins 89. During recording, the stylus 93 engages and cuts a groove in the dictating belt. This groove is modulated in the vertical direction as represented by arrow 94 in accordance with the information being recorded. The stylus also vibrates in the vertical or so called hill and dale mode during reproducing operations. It should be apparent that by selecting a proper mounting for a stylus, information can be recorded on or reproduced from groove type dictating belts employing lateral or vertical mechanical recording techniques.

Referring now to FIGURE 6 of the drawings, there is depicted a recording and reproducing head 100 having a magnetic core structure 101 which is formed to provide a magnetic recording and reproducing gap 102. A permanently magnetized reed 103 has one end clamped by resilient and compliant pads 104 between extensions 105 of the magnetic core structure. The other end of the reed carries a plate like member 106 which supports a recording and reproducing stylus 107. The member 106 projects through an elongated slot 108 in the core structure and taut wires 109 extend from opposite sides of this member to the edges of the slot. The stylus 107 is resiliently and yieldably supported for oscillatory or vibratory movement in the plane indicated by arrow 110. A recording and playback coil 111 and a bias coil 112 are wound about the vertical legs of the magnetic core structure. An erase gap and an erase coil, not shown, can be provided in accordance with the teachings of the previous embodiments of the invention if this is desired. A pair of pivot pins 113 extending from the vertical legs of the magnetic core structure define a means for rotatably supporting the recording and reproducing head so that either the magnetic gap 102 or the stylus 107 is disposed in operative transducing relation with a dictating belt.

The recording and reproducing heads described above can be employed to simultaneously record information on a number of record members using various recording techniques or to sense information previously recorded on a first record medium and cause this information to be recorded on a second and different type of record medium without intermediate amplification. This is illustrated in FIGURE 6 where a magnetic dictating belt 114 is engaged by magnetic recording and reproducing gap 102 and stylus 107 rides against a groove type dictating belt 115. To record information simultaneously, the recording and reproducing coil 111 is energized with signals corresponding to the dictation as relative movement is effected between the dictating belts 114 and 115 and the recording and reproducing head.

Alternately, it may be desired to sense information previously recorded on the groove type dictating belt 115 and record the same information on a magnetic dictating belt 114. This is accomplished without intermediate electrical amplification since the mechanical information sensed by the stylus 107 generates a varying magnetic field in magnetic gap 102 and information is recorded on the magnetic dictating belt 114. Information previously recorded on a magnetic dictating belt 114 might be recorded on a groove type dictating belt 115 in the same manner, although this arrangement may not be as satisfactory because of the low level of signals induced when replaying magnetic belts and relatively large forces required to move the stylus.

In FIGURE 7 of the drawings a still further embodiment of the invention is shown. The recording and reproducing head 120 is employed when it is desired to record dictation on a single dictating belt 121 using a number of different recording methods or techniques. The head has a magnetic core structure 122 provided with a magnetic recording gap 123. Extensions 124 of the core structure support clamping pads 125 which resiliently clamp a horizontally extending and permanently magnetized reed 127 intermediate its ends. One end of reed 127 is attached to a vertical leg of the core structure 122 by a non-magnetic clamping pad 132 while the other end carries a relatively sharp recording stylus 128. An energizing or recording coil 129 is wound about the core structure 122 and is connected with a source of electrical signals corresponding to the dictation to be recorded.

The dictating belt 121 is a combination type belt in that it has magnetic particles coated thereon or embedded therein and yet has a surface which is susceptible to cutting by a recording stylus. The magnetic gap 123 and the stylus 128 are disposed in spaced and slightly offset relation whereby they simultaneously engage the surface of the dictating belt. When energizing signals are supplied to the recording coil 129, the dictating belt rotates as indicated by arrow 131 while the head moves transversely in the direction of arrow 130. This causes the dictation to be recorded as magnetic information and undulations in a groove in generally side-by-side relation.

It should now be apparent that the objects initially set forth have been accomplished. Of particular importance is the provisions of recording and reproducing heads which are capable of recording and reproducing information on record members employing a plurality of recording and reproducing methods or techniques. The recording and reproducing heads shown herein use magnetic and mechanical recording methods which are particularly useful in the dictating art. However, in its broader aspects, the invention envisions the use of alternate or additional recording means in the heads based on optical and other phenomena.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A recording and reproducing head for use with dictating apparatus employing both magnetic and groove type dictating belts comprising:
- a generally rectangular magnetic core structure defining a magnetic circuit;
- at least one recording and reproducing coil for inducing and sensing signals in said magnetic circuit;
- a magnetic recording and reproducing gap in said magnetic circuit for recording and reproducing information on a magnetic dictating belt;
- a pair of adjacent pole pieces in said magnetic circuit;
- a permanently magnetized reed;
- means mounting one end portion of said permanently magnetized reed in magnetically insulated relation relative to said magnetic circuit;
- the other end portion of said permanently magnetized reed extending between said pole pieces in magnetically coupled relation therewith;
- a recording and reproducing stylus; and
- means connecting said recording and reproducing stylus with said other end portion of said permanently magnetized reed for recording and reproducing information on a groove type dictating belt.

2. Apparatus according to claim 1 further characterized by:
- said magnetic gap and said stylus being spaced from each other;
- a dication recording and reproducing station; and
- means mounting said recording and reproducing head for indexing movement to permit said magnetic gap and said stylus to be selectively positioned in operative recording and reproducing relation with a dictating belt at said recording and reproducing station.

3. Apparatus according to claim 1 further characterized by:
- said magnetic gap and said stylus being located on opposite sides of said magnetic circuit;
- a recording and reproducing station; and
- means mounting said recording and reproducing head for rotary indexing movement to permit said magnetic gap and said stylus to be selectively positioned in operative recording and reproducing relation with a dictation belt at said recording and reproducing station.

4. Apparatus according to claim 1 further characterized by:
- mounting pads formed of resilient and compliant material disposed between said other end portion of said permanently magnetized reed and said pole pieces; and
- said mounting pads yieldably maintaining said other end portion of said permanently magnetized reed in generally centered relation between said pole pieces.

5. Apparatus according to claim 1 further characterized by:
- said means connecting comprising a thin plate like member; and
- a pair of taut wires extending from said plate-like member for yieldably mounting said permanently magnetized reed in generally centered relation between said pole pieces.

6. A recording and reproducing head for use with apparatus employing at least two types of record media comprising:
- a magnetic core structure defining a magnetic circuit;
- a magnetic gap in said magnetic circuit for recording and reproducing information on a magnetic record medium;
- a recording member for recording and reproducing information on another type of record medium;
- means connecting said recording member in magnetical coupled relation with said magnetic circuit;
- said magnetic gap and said recording member being mounted at spaced points;
- a recording and reproducing station; and
- means mounting said transducer for indexing movement to selectively position said magnetic gap and said recording member at said recording and reproducing station.

7. A dictating machine for recording and reproducing information on different types of dictating belts comprising:
- means for supporting a dictating belt for rotation;
- a transducer means;
- means for effecting relative movement between said transducer means and said means for supporting to provide a helical recording pattern on a dictating belt;
- said transducer means having a magnetic recording means for recording and reproducing dictation on a magnetic dictating belt;
- said transducer means having a stylus recording means for recording and reproducing information on a groove type dictating belt;
- said magnetic recording means and said stylus recording means being located at spaced positions; and
- means mounting said transducing means for indexing movement relative to said means for supporting to selectively position one of said recording means in operative relation with a dictating belt received on said means for supporting.

8. Apparatus according to claim 7 further characterized by:
- said transducer means comprises a magnetic core structure defining a magnetic circuit;
- said magnetic recording means comprises a magnetic gap in said magnetic circuit;
- said stylus recording means comprises a stylus; and
- a magnetized reed operatively connecting said stylus in operative relation in said magnetic circuit.

9. Apparatus according to claim 7 further characterized by:
- said means for effecting comprises a pair of lead screws having different pitches;
- said lead screws extending in generally parallel aligned relation;
- means projecting from said transducer means for engagement with said lead screws; and
- said means projecting comprising means for selectively engaging said lead screws in accordance with the index position of said transducing means.

10. A dictating machine for recording and reproducing information on different types of dictating belts comprising:
- means for supporting a dictating belt for rotation;
- a transducer head;
- means for effecting relative movement between said transducer head and said means for supporting to provide a helical recording pattern on a dictating belt;
- said transducer head having a first recording means for recording and reproducing information on a dictating belt of a first type;
- said transducer head having a second recording means for recording and reproducing information on a dictating belt of a second type;
- said first and said second recording means being located at spaced positions relative to each other;
- means mounting said transducer head for indexing movement to selectively position said first and second recording means in operative recording and reproducing relation with a dictating belt received on said means for supporting; and
- means for changing said means for effecting relative movement in accordance with the recording means positioned in operative relation with a dictating belt received on said means for supporting when said transducer head moves in said indexing movement.

11. Apparatus according to claim 10 further characterized by:
said first recording means comprises a magnetic gap;
said second recording means comprises a stylus; and
said dictating belts of said first and second types comprising magnetic and stylus type dictating belts.

12. Apparatus according to claim 10 further characterized by:
said means for effecting relative movement comprises a pair of lead screws having different pitches; and
said means for changing comprises means for selectively connecting said lead screws in driving relation with said transducer head in accordance with the recording means positioned in operative relation with a dictating belt on said means for supporting.

13. Apparatus for recording and reproducing information on different types of record media comprising:
means for supporting a record medium for movement;
a transducer head;
means for effecting relative movement between said transducer head and said means for supporting;
said transducer head having a first recording means for recording and reproducing information on a recording medium of a first type;
said transducer head having a second recording means for recording and reproducing information on a recording medium of a second type;
said first and said second recording means being located at spaced positions relative to each other;
means mounting said transducer head for indexing movement to selectively position one of said first and second recording means in operative recording and reproducing relation with a record medium received on said means for supporting; and
means for changing said means for effecting relative movement in response to indexing movement of said transducer head to select a driving arrangement in accordance with the recording means positioned in operative relation with the recording medium received on said means for supporting.

14. Apparatus according to claim 13 further characterized by:
said first recording means comprises a magnetic gap;
said record medium of said first type being a magnetic recording medium;
said second recording means comprises a stylus; and
said record medium of said second type being a groove type recording medium.

15. A transducer head for use with recording and reproducing apparatus comprising:
a magnetic core structure defining a magnetic circuit;
a magnetic gap in said magnetic circuit;
a pair of adjacent pole pieces in said magnetic circuit;
a magnetized reed;
means mounting at least a portion of said magnetized reed in magnetically coupled relation with said pole pieces;
a stylus;
means connecting said stylus with said magnetized reed;
said magnetic gap and said stylus being spaced from each other;
a recording and reproducing station; and
means mounting said transducer head for indexing movement to permit selective positioning of said magnetic gap and said stylus at said recording and reproducing station.

16. Apparatus according to claim 15 further characterized by:
said permanently magnetized reed being disposed between and lying in the plane of said pole pieces; and
said mounting means comprises pivot means connected to said permanently magnetized reed intermediate the ends thereof to permit pivotal movement of said reed about an axis extending transversely to the longitudinal axis of said permanently magnetized reed.

17. A transducer head for use in recording or reproducing apparatus comprising:
a magnetic core structure defining a magnetic circuit;
a first transducing means for recording or reproducing information on a record medium of a first type employing a first recording phenomena;
said first transducing means comprising a magnetic gap in said magnetic circuit;
a second transducing means for recording or reproducing information on a record medium of a second type employing a second recording phenomena;
said second transducing means comprising a pair of adjacent pole pieces in said magnetic circuit, a magnetized reed having at least a portion thereof mounted in magnetically coupled relation with said pole pieces, and a stylus connected with said magnetized reed; and
said pair of adjacent pole pieces, said magnetized reed and said stylus being positioned at a location remote from said magnetic gap.

References Cited

UNITED STATES PATENTS

| | | | |
|---|---|---|---|
| 2,402,985 | 7/1946 | Caughey et al. | 179—100.2 |
| 2,605,364 | 7/1952 | Masterson | 179—100.2 |
| 2,622,156 | 12/1952 | Baker | 179—100.41 |

BERNARD KONICK, *Primary Examiner.*

J. R. GOUDEAU, *Assistant Examiner.*

U.S. Cl. X.R.

179—100.2, 100.41